June 18, 1946.　　　D. BRADBURY　　　2,402,363

TURBINE APPARATUS

Filed Oct. 21, 1943

WITNESSES:

INVENTOR
Donald Bradbury
BY
ATTORNEY

Patented June 18, 1946

2,402,363

UNITED STATES PATENT OFFICE 2,402,363

TURBINE APPARATUS

Donald Bradbury, Prospect Park, Pa., assignor to Westinghouse Electric Corporation, East Pittsburgh, Pa., a corporation of Pennsylvania Application October 21, 1943, Serial No. 507,090

5 Claims. (Cl. 60—35.6)

This invention relates to power plants of the gas turbine type and it has for an object to provide improved means for regulating the jet of motive fluid discharged from the plant.

In the application of Stewart Way, Serial No. 482,533, filed April 10, 1943, and assigned to the assignee of the present invention, there is disclosed and claimed a type of power plant which has a relatively small maximum diameter and which is constructed and arranged to provide minimum drag when used for aircraft propulsion. In the power plant shown in the Way application, the plant is arranged so that the jet issuing therefrom is utilized to propel the aircraft. In accordance with my invention, I provide improved means for regulating this jet to control the back pressure on the gas turbine and the velocity of the jet.

Therefore, a further object of the invention is to provide a gas turbine power plant including improved adjustable means for regulating the propulsion jet issuing from the plant.

Figure 1:
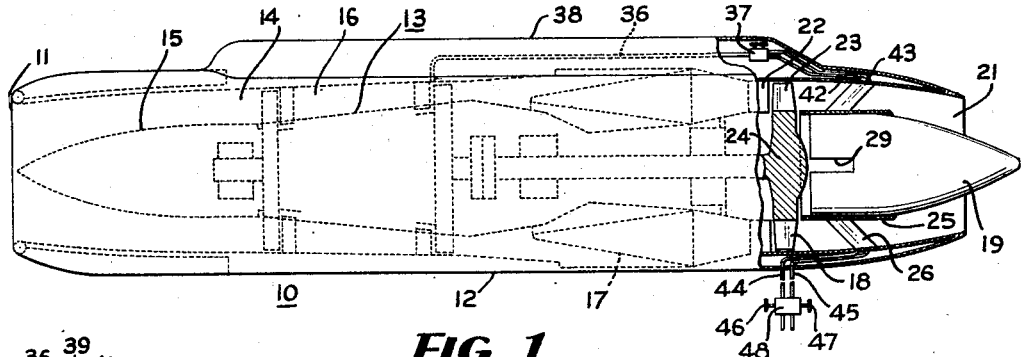
Figure 2:
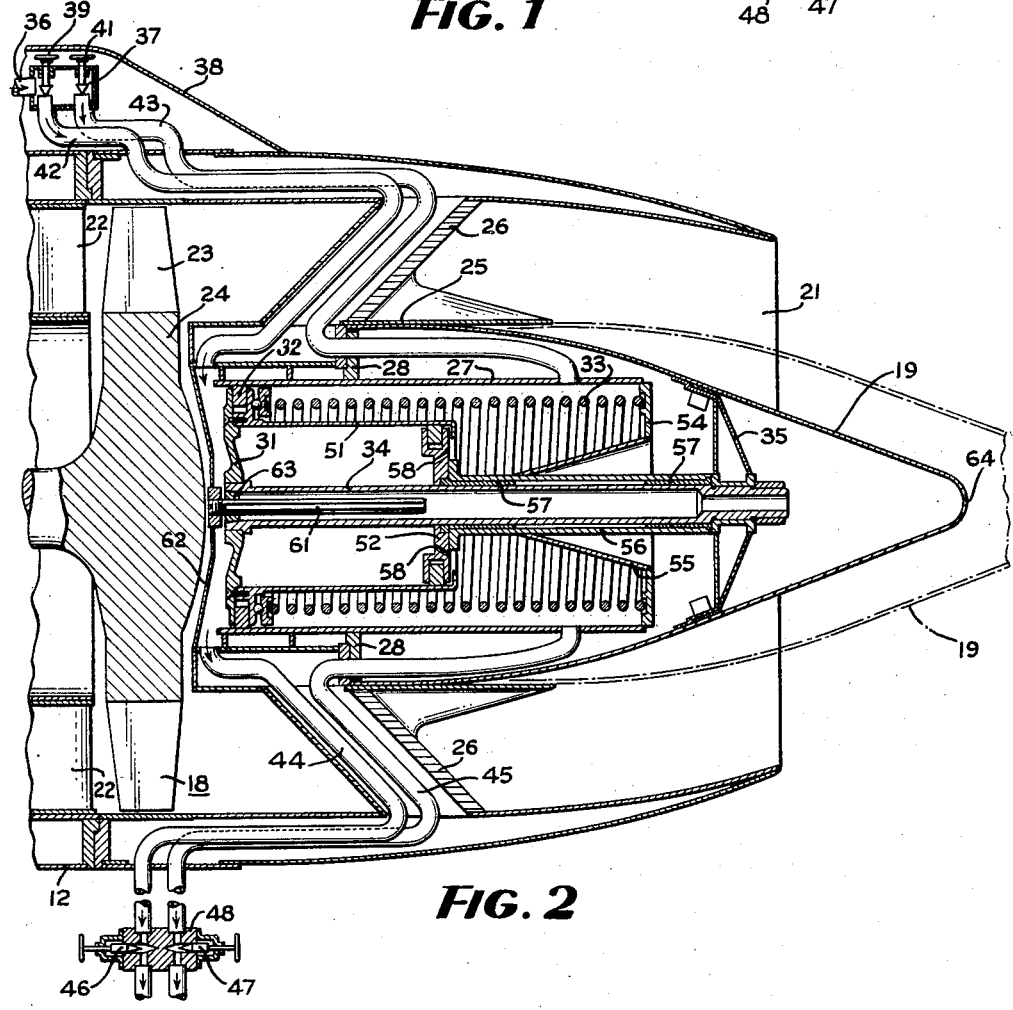

These and other objects are effected by the invention as will be apparent from the following description ar claims taken in connection with the accompanying drawing, forming a part of this application, in which:

Fig. 1 is a side elevational view of a power plant in which the present invention is incorporated, a portion of the outer casing being broken away near the rear end of the plant to better illusrate the invention; and Fig. 2 is an enlarged vertical sectional view through the plant at the portion broken away in Fig. 1.

The power plant shown in Fig. 1, generally indicated at 10, is adapted to be mounted in or on the fuselage or wings of airplanes with the left, or intake 11, as viewed in this figure, pointed in the direction of flight. The power plant comprises an outer shell or casing structure 12, which, together with an inner core structure indicated generally at 13, provides annular air duct 14 extending through the casing structure fore and aft with respect to the airplane. The core structure 13 is coaxial with and supported by the casing structure and comprises a nose portion 15 in which fuel and lubricating oil pumps and ignition apparatus (not shown) may be supported. The core structure further includes an axial-flow compressor 16, combustion apparatus 17, a turbine 18, and an adjustable core member or tailpiece 19, which, together with the rear of the casing 12, defines an adjustable propulsion nozzle 21.

The operation of the power plant is preferably as follows: Air enters at the intake 11, and flows through the compressor 16 where it is compressed and into the combustion apparatus 17, which may be of any suitable construction and arranged to add heat to the compressed air supplied by the compressor. The combustion apparatus may be like that shown in said Way application and comprises one or more burner tubes in which the compressed air is mixed with fuel, the mixture being burned providing a hot motive fluid comprising the products of combustion and excess air. The hot motive fluid on leaving the combustion apparatus is directed by suitable guide vanes 22 against moving blades 23 of the rotor 24 of the turbine 18. The residual energy available in the motive fluid leaving the turbine blades is discharged through the nozzle 21 as a jet to propel or aid in propelling the airplane.

In starting the power plant, it is desirable that the back pressure on the turbine 18 be at a minimum and, therefore the propulsion nozzle 21 is made adjustable so that it may be opened to a maximum to provide minimum restriction to the flow of the hot motive fluid through the nozzle. However, when the power plant is up to speed as when the aircraft is ready to take off, it is desirable to reduce the flow area of the propulsion nozzle to provide a jet of maximum velocity. During flight it may be desired to vary the flow area of the propulsion nozzle in order to change the jet effect thereof. These adjustments of the nozzle 21 are obtained by mounting the tailpiece 19 for longitudinal movement along the longitudinal axis of the plant. The tailpiece is in the form of a fairing cone and together with the rear, tapered interior surface of the casing structure, varies the flow area of the propulsion nozzle when shifted longitudinally with respect to the casing structure.

The fairing cone 19 is slidably mounted for axial movement in the casing structure within a ring 25, coaxial with the cone and supported from the casing structure by hollow struts 26 secured at their inner ends to the ring and at their outer ends to the casing structure. These struts are of streamline section and while but two are visible in the drawing, it is preferred to provide at least four although any desired number may be employed.

A cylinder 27 is located within the fairing cone and is fixedly supported from the ring 25 and struts 26 by suitable spacers 28 secured to the cylinder and to the ring in the region of the struts 26. As shown at 29 in Fig. 1, the fairing cone is notched to clear the supporting spacers 28.

A piston 31 having a sealing ring 32 is slidable in the cylinder and is biased to the left, as viewed in Fig. 2, by a compression spring 33. The piston 31 carries a hollow piston rod 34 which extends through the cylinder and at the end remote from the piston is connected to the interior of the tailpiece or fairing cone 19 by a spider 35.

From the structure thus far described, it will be seen that the tailpiece 19 moves with the piston 31 and that the compression spring normally biases the piston and tailpiece to the left as viewed in Fig. 1. In the latter position, the propulsion nozzle is wide open and may be termed the "starting position."

The piston 31 is displaced relative to its cylinder 27 by a differential of air pressure at opposite sides thereof. This differential in pressure is obtained by by-passing some of the compressed air from the final stage of the compressor through a conduit 36 which leads to a valve block 37 which may be mounted in a housing 38 carried by the casing 12. The valve block 37 is provided with two outlet ports controlled by needle valves 39 and 41 and connected respectively to two conduits 42 and 43 extending through the upper hollow strut 26.

As shown particularly in Fig. 2, the conduit 42 opens into the closed space to the left of the piston 31 while the other conduit 43 opens into the piston chamber to the right of the piston. It will be understood that, by adjusting the needle valves 39 and 41, the amount of air flowing from the compressor to each side of the piston may be readily controlled.

A second pair of conduits 44 and 45 lead from the closed spaces at each side of the piston 31 and discharge through adjustable needle valves 46 and 47, respectively, mounted in a second valve block 48 for bleeding air from the spaces separated by the piston. The differential in pressure acting on the piston 31 may be regulated by adjusting the needle valves in either of the valve blocks, although it is preferred to locate the second valve block 48 at a point accessible to the airplane pilot.

The needle valves in the first valve block 37 are preferably initially adjusted and remain at that adjustment so that compressed air is at all times flowing to each side of the piston, while the needle valves in the second valve block 48 are manually adjusted by the pilot to provide the necessary bleeding from each side of the piston to shift it and the tailpiece to the desired position. Thus, air is at all times flowing through the control system and thereby effects cooling of the tailpiece adjusting structure.

From the above, it will be understood that needle valves 46 and 47 of the second valve block 48 may be adjusted to provide any desired pressure differential on the opposite sides of the piston. The compression spring 33 is calibrated so that for a given pressure differential a given displacement of the piston 31 and the tailpiece 19 carired thereby results.

In order to smooth out the motion of the tailpiece while being shifted from one position to another, a dashpot is provided. This dashpot comprises a cylinder 51 carried by the piston 31 which moves therewith. A fixed piston 52 in this cylinder is carried by the outer cylinder 27 by means of an end plate 54 and cone 55 which is connected to a central sleeve 56. The sleeve 56 carries bearings 57 in which the piston rod 34 is slidable.

As the piston 31 is shifted back and forth by regulation of the valves 46 and 47, the volume of the cylinder 51 changes and leakage of air through small ports 58 in the fixed piston 52 provide for slow bleeding of air between the dashpot cylinder 51 and the main cylinder 27 to cushion the travel of the tailpiece. When the tailpiece reaches its adjusted position, the pressures within the dashpot and the cylinder 27 equalize.

To effect further cooling of the cone-adjusting structure, bleeding of air may be further provided by means of a slotted tube 61 carried by the cylinder head 62 and extending into the hollow piston rod 34 through a sealing ring 63 mounted centrally in the movable piston 31. As the piston 31 is shifted to the right, as viewed in Fig. 1, the slot in the tube 61 is in communication with the closed space on the left side of the piston 31 and opens into the hollow piston rod, so that air bleeds continuously into the rear of the tailpiece. This air discharges through an aperture 64 provided at the tip of the tailpiece. If desired, the slot in the member may be tapered so that bleeding progressively increases as the piston moves to the right.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In combination with a gas turbine power plant including an air compressor and means utilizing gases exhausting from the turbine to secure a propulsive effect, said means comprising a nozzle including a tubular casing and a core member cooperating therewith to provide an annular nozzle passage, means for mounting the core member for axial movement to vary the back pressure imposed by the nozzle, and means for moving the core member including a cylinder, a piston in the cylinder and connected to the core member, means biasing the piston for movement in one direction, and means for supplying compressed air from a suitable stage of said compressor to the piston to move the latter against the force of the biasing means.

2. In combination with a gas turbine power plant including a tubular casing structure having a central core structure defining an annular flow passage through said casing structure, said core structure including a compressor and a gas turbine for driving said compressor, said turbine being driven by motive fluid supplied by said compressor; of an adjustable core member mounted rearwardly of said turbine and compressor adjacent the rear end of said casing structure and defining therewith an annular propulsion nozzle for the motive fluid flowing from said turbine, said core member being adjustable with respect to said casing structure to vary the back pressure imposed on said turbine and the jet effect of the motive fluid issuing from said nozzle, a cylinder and piston mounted in said casing structure and arranged upon movement of said piston relative to said cylinder to shift said core member relative to said casing structure, means for supplying compressed air from said compressor to said piston and cylinder for effecting movement of said piston relative to said cylinder.

3. In combination with a gas turbine power plant including a tubular casing structure having a central core structure defining an annular flow passage through said casing structure, said core structure including a compressor and a turbine for driving said compressor, said turbine being driven by motive fluid supplied by said compressor; of an adjustable core member mounted rearwardly of said turbine and compressor adjacent the rear end of said casing structure and defining therewith an annular propulsion nozzle for the motive fluid flowing from said turbine, said core member being adjustable with respect to said casing structure to vary the back pressure on said turbine and the jet effect of the motive fluid issuing from said nozzle, a cylinder and piston mounted in said casing structure and arranged upon movement of said piston relative to said cylinder to shift said core member relative to said casing structure, means for supplying compressed air from said compressor to opposite sides of said piston, and adjustable means for bleeding air from opposite sides of said piston to vary the differential in pressure between opposite sides of said piston for effecting movement of said piston relative to said cylinder.

4. In combination with a gas turbine power plant including a tubular casing structure having a central core structure defining an annular flow passage through said casing structure, said core structure including a compressor and a turbine for driving said compressor, said turbine being driven by motive fluid supplied by said compressor; of an adjustable core member mounted rearwardly of said turbine and compressor adjacent the rear end of said casing structure and defining therewith an annular propulsion nozzle for the motive fluid flowing from said turbine, said core member being adjustable with respect to said casing structure to vary the back pressure on said turbine and the jet effect of the motive fluid issuing from said nozzle, a cylinder and piston mounted in said casing structure and arranged upon movement of said piston relative to said cylinder to shift said core member relative to said casing structure, means for supplying compressed air from said compressor to said piston and cylinder for effecting movement of said piston relative to said cylinder, and a dashpot arranged to cushion the movement of said piston relative to said cylinder.

5. In combination with a gas turbine power plant including a tubular casing structure having a central core structure defining an annular flow passage through said casing structure, said core structure including a compressor and a turbine for driving said compressor, said turbine being driven by motive fluid supplied by said compressor; of an adjustable core member mounted rearwardly of said turbine and compressor adjacent the rear end of said casing structure and defining therewith an annular propulsion nozzle for the motive fluid flowing from said turbine, said core member being adjustable with respect to said casing structure to vary the back pressure on said turbine and the jet effect of the motive fluid issuing from said nozzle, a cylinder and piston mounted in said casing structure and arranged upon movement of said piston relative to said cylinder to shift said core member relative to said casing structure, means for supplying compressed air from said compressor to opposite sides of said piston for effecting movement of said piston relative to said cylinder, means biasing said piston in one direction, and means for regulating the differential in air pressure between opposite sides of said piston whereby said differential in pressure determines the position of said core member relative to said casing structure.

DONALD BRADBURY.